United States Patent [19]

Schuddemage et al.

[11] 4,007,234
[45] Feb. 8, 1977

[54] PROCESS FOR PREPARING IMPACT RESISTANT STYRENE POLYMERS

[75] Inventors: Horst-Dieter Schuddemage, Florsheim; Horst Jastrow, Niederhochstadt; Harry Barth, Frankfurt am Main, all of Germany

[73] Assignee: Hoechst Aktiengesellschaft, Frankfurt am Main, Germany

[22] Filed: June 26, 1975

[21] Appl. No.: 590,571

[30] Foreign Application Priority Data

June 28, 1974 Germany .......................... 2431125

[52] U.S. Cl. ........................................... 260/878 R
[51] Int. Cl.² ..................... C08J 3/24; C08F 255/06
[58] Field of Search ................................ 260/878 R

[56] References Cited

UNITED STATES PATENTS

| 3,177,269 | 4/1965 | Nowak et al. | 260/878 R |
| 3,177,270 | 4/1965 | Jones et al. | 260/878 R |
| 3,862,265 | 1/1975 | Steinkamp et al. | 260/878 R |
| 3,893,968 | 7/1975 | Shiga et al. | 260/878 R |

*Primary Examiner*—Alan Holler
*Attorney, Agent, or Firm*—Curtis, Morris & Safford

[57] ABSTRACT

There is disclosed a process for preparing impact resistant styrene graft copolymers having improved properties, especially a high gloss. They are obtained by polymerizing a solution of an ethylene/propylentercomponent rubber in a mixture of styrene and acrylonitrile in one step (mass polymerization) or two steps (mass/suspension polymerization) in the presence of an organic peroxide and submitting the polymer to a two step extrusion, the first step being carried out at temperatures of from 130° to 240° C, the second step at temperatures of from 200° to 280° C, and providing that during the second extrusion step a quantity of about 0.05 to about 0.5% by weight of the organic peroxide is still present.

7 Claims, No Drawings

PROCESS FOR PREPARING IMPACT RESISTANT STYRENE POLYMERS

The present invention provides a process for preparing thermoplastic graft copolymers, having a high toughness, a high hardness and good melt flowing properties as well as a high surface gloss.

Graft copolymers of styrene and acrylonitrile on a butadiene homo- or copolymer are known as ABS polymers. ABS polymers prepared by graft copolymerization of styrene and acrylonitrile on an ethylene/propylene/tertiary component rubber and having an essentially improved weather resistance are known as well.

Such graft copolymers may be prepared by mass or by mass/suspension polymerization. This process where a solution of the rubber in monomeric styrene or a styrene/acrylonitrile mixture is partly polymerized in mass and is further polymerized in mass or in suspension until the polymerization is terminated normally yields impact resistant polystyrenes or impact resistant styrene/acrylonitrile copolymers having a good toughness, good flow properties and a sufficient hardness. Injection moulded parts prepared from these products, however, have only a very low surface gloss.

For this reason ABS polymers intended to have a high surface gloss, most frequently are prepared according to the emulsion polymerization process. In this process both the rubber and the graft polymer of styrene/acrylonitrile on the rubber are prepared in aqueous emulsion. The ABS polymers thus obtained are distinguished by an especially high surface gloss of the injection moulded parts prepared therefrom as compared with those prepared by a mass suspension process. On the other hand it is known that the emulsion process is more expensive technically and, consequently, less profitable than the mass and/or suspension process, among others owing to the fact that the working up of the waste water obtained is necessary to achieve environmental protection.

Three processes have become known hitherto for partially overcoming the difficulties due to the mass/suspension process. The surface gloss may be improved.
1. by using extremely high shearing forces in the prepolymerization (cf. German Offenlegungsschrift No. 2,135,348),
2. by adding nonpolar hydrocarbons as solvents (cf. German Offenlegungsschrift No. 2,233,543; U.S. Pat. No. 3,538,190).
3. by adding separately prepared graft copolymers of styrene/acrylonitrile on ethylene/propylene/tertiary component rubber or on polybutadiene acting as oil in oil emusifiers (cf. U.S. Pat. No. 3,538,192).

It is further known that polymer melts are subjected to a more or less great shearing in suitable machines such as extruders, which may even partially cause a breaking of the polymer molecules. Advantage is taken of this fact especially in the degradation process of polyethylene melts of high molecular weight. It is also known that polymers may be cross-linked in the melt by the addition of initiators.

A process has now been found for preparing impact resistant styrene graft copolymers by a mass or a mass/suspension polymerization initiated thermally or by monomer soluble initiators of
a. 98 to 70% by weight of a mixture of
   aa. 90 to 70, preferably 80 to 70% by weight of styrene and/or at least one styrene derivative and
   ab. 10 to 30, preferably 20 to 30% by weight of acrylonitrile and/or at least one further copolymerizable derivative of acrylic acid in admixture with
b. 2 to 30% by weight of an ethylene/propylene/tertiary component rubber (EPTR), the quantities (aa) and (ab) being calculated on the total quantity of the monomers and the quantities (a) and (b) on the quantity of the monomers and rubber, which comprises adding prior to or in the course of the polymerization an organic peroxide and submitting the polymer obtained to a two-step extrusion, whereby rubber particles of a size of less than 1 $\mu$ are prepared by product shearing in the melt in the first step at temperatures of from 130° to 240° C and a cross-linking of the rubber particles is carried out in the second step at temperatures of from 200° to 280° C, the quantity, the half life and the moment of addition of the peroxide as well as the polymerization and shearing temperatures being adjusted such that after the termination of the shearing a quantity of peroxide sufficient for cross-linking the polymer is still present in the polymer, said quantity of peroxide being in the range of about 0.05 to about 0.5% by weight, calculated on the total quantity of monomers and rubber.

Instead of styrene as monomeric component (aa) there may be used as well styrene derivatives such as $\alpha$-methyl-styrene or styrenes methylated in the nucleus (for example o- or p-vinyl toluene or vinyl xylenes) or styrenes halogenated in the nucleus (for example o- or p-chloro- or bromostyrene) or vinyl cyclohexane or methylated or halogenated derivatives of vinyl cyclohexane or a mixture of styrene and one or more derivatives of styrene, preferably a mixture of 95 to 60% by weight of styrene and 5 to 40% by weight of $\alpha$-methyl-styrene and instead of acrylonitrile as monomeric component (ab) there may be used copolymerizable acrylic acid derivatives such as methacrylonitrile or esters of acrylic acid, methacrylic, acid, itaconic acid (=carboxymethylacrylic acid), maleic acid (= carboxyacrylic acid) or fumaric acid with lower aliphatic alcohols(for example methanol, ethanol, isopropanol, butanol, isobutanol, hexanol, octanol, isooctanol or 2-ethyl hexanol) alone or in combination with one another or with acrylonitrile.

Mixtures of 20 to 30% by weight of acrylonitrile and 80 to 70% by weight of styrene are used especially preferably to obtain the desired resistance to solvents, tensile strength, crazing and heat resistance of the polymers prepared therefrom according to the process of the invention.

Suitable ethylene/propylene/tertiary component rubbers are those obtained by polymerization of 69.5 to 30% by weight of ethylene, 30 to 69.5% by weight of propylene and 0.5 to 15% by weight of a diolefinic tertiary component. Suitable tertiary components are diolefins having at least 5 carbon atoms, the double bonds of which are not conjugated such as 5-ethylidene norbornene, dicyclopentadiene, 2,2,1-bicyoloheptadiene and 1,4-hexadiene.

The polymerization according to the process of the invention may be carried out in mass as well as in mass/suspension. It is recommended in both cases to dissolve the EPTR in the nonpolar monomer(s) (aa) containing only carbon and hydrogen atoms, such as for example styrene. Usual nonpolar additives such as white oils (mixtures of aliphatic hydrocarbons having a boiling point in the range of from 100° to 300° C) may be added as well. After solution has been effected, the reaction mixture is heated and the polar monomer(s) (ab) are added. The moment and the time of addition may vary within wide limits. The above mentioned procedure in any case guarantees that a solution of EPTR in the monomer mixture is present when attaining the polymerization temperature.

It is known that the mass polymerization can be carried out by using one or several monomer soluble initiators such as t-butyl perbenzoate, t-butyl peracetate, dibenzoyl peroxide, t-butyl peroctanoate, dilauryl peroxide, or nitrogen compounds yielding radicals when decomposing such as azodiisobutyronitrile. These initiators may be used additionally to the peroxide to be used according to the process of the invention in the usual concentration range of about 0.05 to 1% by weight, preferably 0.1 to 0.4% by weight, calculated on the total quantity of monomers and EPTR, if desired.

The same applies to the mass/suspension polymerization, where polymerization is carried out in two different steps. The prepolymerization (first step) is effected in mass while stirring until a phase change can be observed. The grafting of the monomers on EPTR and the viscosity of the polystyrene/acrylonitrile phase can be influenced in this process by adding monomer soluble initiators and regulators. Both additives as well as the nature and the intensity of the stirring influence in known manner the rubber morphology. In the second step following the prepolymerization polymerization is continued and terminated as a suspension polymerization by suspension in water. The rubber morphology obtained in the prepolymerization should remain unchanged thereby.

The suspension polymerization does not differ in its nature from the polymerization in mass; the distribution of the prepolymerisate in water only serves to promote an easier dissipation of the reaction heat arising from the polymerization. The mass/suspension polymerization (first step = mass polymerization, second step = suspension polymerization) however differs from the mass/mass polymerization (first and second step both being mass polymerizations) in being effected discontinuously, whereas the latter is effected continuously, without influencing the properties of the product obtained.

The suspension polymerization is carried out in the presence of 0.05 to 0.4% by weight of known suspension stabilizers such as water soluble cellulose ethers, gelatine, polyvinyl alcohol, partially saponified polyvinyl acetate or tricalcium phosphate.

The desired polymerization degree (molar weight) is obtained by means of the regulators traditionally used in the styrene polymerization such as dimeric $\alpha$-methylstyrenes in a concentration range of about 0.1 to 1% by weight or with mercaptans such as n- or t-dodecyl mercaptan being added in an amount of about 0.01 to 0.5% by weight.

The polymerization initiators as well as the molar weight regulators may be added at the same time or subsequently in measured portions as the polymerization proceeds in the prepolymerization (first step) and/or in the following second polymerization step.

The peroxide to be used according to the process of the invention is added either prior to the polymerization or at any time in the course of the polymerization. Its essential function is to initiate the cross-linking of the rubber particles in the last step of the process of the invention. It further may act alone or in the presence of the other above-cited monomer soluble initiators in the course of the polymerization. It is preferably added in an amount of from about 0.06 to about 0.6% by weight (calculated on the total quantity of monomers and rubber). In determining this amount it must be taken into account that a more or less large part of the peroxide, depending on the polymerization and shearing temperatures, the moment of addition and the half life, has already decomposed at the beginning of the crosslinking. The choice of the peroxide with regard to its half life, the quantity and the moment of addition as well as the polymerization and shearing temperature must be adjusted such that a quantity of peroxide sufficient for a cross-linking of the polymer, said quantity being about 0.05 to about 0.5% by weight calculated on the total quantity of monomers and rubber, is still present in the polymer after having terminated shearing.

Suitable peroxides to be added according to the process of the invention are organic peroxides having a half life of at least 5 hours at 120° C, especially di-t-butyl peroxide. The latter peroxide, owing to its relatively long half life, may be added prior to or in the course of the prepolymerization (in case that the polymerization is effected in two steps) without excessive decomposition to effect the desired cross-linking produced during polymerization at the usually employed temperatures of about 100° to 150° C and following shearing at about 130° to 240° C. The shorter the half life of the peroxide the larger must be the quantity added and/or the later must the addition be effected at the given polymerization and shearing temperatures. These relations may be readily estimated by one skilled in the art and be determined quantitatively by a few control tests. The indication that the addition of the peroxide to be used according to the process of the invention may be effected also in the course of the polymerization is to be understood to mean that there is still a sufficiently long period of time for a homogeneous distribution of the peroxide to take place in the polymer prior to the end of the polymerization. It is quite evident that such a homogeneous distribution may not be assured, if the peroxide to be used according to the process of the invention is not added until just before termination the polymerization. Therefore the peroxide should be added generally not later than the tune at which a conversion of about 80% has been obtained. This is also the reason why peroxides having a half life of at least 5 hours at 120° C and thus permitting an early addition are preferably used for the process of the invention.

To obtain the required combination of properties, i.e. toughness, hardness and gloss, the polymerization is followed by a combined shearing and cross-linking in two steps, an extrusion, which in a first step at temperatures of from 130° to 240° C, preferably of 150° to 180° C, adjusts the desired rubber morphology to particle sizes less than 1 $\mu$ by product shearing in the melt, and in the second step at temperatures of 200° to 280° C bringing about the required cross-linking of the rubber particles of less than 1 $\mu$ by decomposition of the residual peroxide used according to the process of the invention.

The temperatures of the feeding and of the compression zone of the extruder are relatively low and are in the range of 130° to 240° C, preferably of 150° to 180° C. This portion of the extruder may also be cooled, if required. There may be one or several screw shearing elements in this portion of the extruder for the purpose of improving the product shearing. The following portion of the extruder up to the nozzle contains a screw conveyor having temperature in the range of 200° to 280° C, preferably 220° to 260° C.

The times of direct contact of the polymer melts in the extruder may vary within wide limits and generally are in the range of from 1 to 15 minutes depending on the temperatures used.

When proceeding in the aforesaid manner products are obtained which are distinguished by an excellent combination of toughness, hardness and gloss, which may not be obtained with products prepared in a conventional manner in mass/suspension polymerization.

The process of the invention has the further advantage that the process steps required in the known processes cited above in the description of the state of the art, such as the addition and/or the elimination of the solvent or the separate preparation of graft polymers may be dispensed with. The process of the invention moreover avoids the difficulties that arise when extremely high shearing forces are used in the prepolymerization step to achieve a suitable rubber morphology.

The process, when compared to known processes, has the advantage of a shorter reaction time and a smaller residual monomer contents.

The following examples illustrate the invention. There is used in all experiments an EPTR having about 10 ethylidene norbornene units per 1000 carbon atoms, a propylene content of about 50% by weight and an average molecular weight $M_w$ of 200,000.

EXAMPLE 1

In a polymerization apparatus consisting of a 70 liter autoclave for the mass prepolymerization and a 140 liter autoclave for the suspension polymerization 7,860 g of EPTR were dissolved while stirring in 34,000 g of styrene for 8 hours at 50° C in the prepolymerization vessel (P vessel). When the rubber had dissolved 10,430 g of acrylonitrile, 52.3 g of di-t-butyl peroxide as initiator, 210 g of dimeric α-methyl styrene and 1,570 g of white oil were added thereto. The rubber precipitated in the form of a compact swollen gel. The contents of the vessel were heated to 120° C at 1 atmosphere gauge and this temperature was maintained until the prepolymer had undergone a phase change and had reached a solids content of 30 to 32%.

The temperature inside of the P vessel was maintained by means of vaporization of the acrylonitrile at a given pressure, the external temperature remaining constant, i.e. the excess of polymerization heat which could not be dissipated by means of the wall cooling was dissipated by reflux cooling.

The content of the vessel were cooled to 65° C (the cooling may be accelerated by a more intensive reflux cooling, i.e. by reducing the pressure). Then 244 g of 75% dibenzoyl peroxide, 600 g of styrene and 180 g of acrylonitrile were added and mixed with the prepolymerisate for 15 minutes. Thereafter the mixture was discharged into the suspension vessel (S vessel), which already contained a solution of 104 g of partially saponified polyvinyl acetate (having a residual acetyl content of 12% and a viscosity of the 4% by weight aqueous solution of about 40 centistokes at 20° C) in 90 liter of distilled water. The whole was dispersed at 80° C for half an hour and then polymerization was carried on at 85° C for one hour, at 90° C for one hour and at 100° C for three hours and terminated. The polymer beads were separated from water, dried and mixed with 150 g of 2,6-di-tertiary-butyl-4-methylphenol as stabilizer. The product was extruded by means of various extruders under varying conditions. Test specimens according to DIN (DIN = German Industrial Standard) were prepared by injection moulding at 240° C from the granulate obtained. The test data are indicated for each test in Tables 1 and 2 under the corresponding letter.

Case A, extrusion by means of a Leistritz-double screw-laboratory extruder:

The geometry of the screw and the temperatures of the extrusion in this case were chosen such that the polymer beads in the first step were sheared at relatively low temperatures and then cross-linked in the second step at higher temperatures.

| | |
|---|---|
| temperature of the shearing zone: | 180° C |
| temperature of the cross-linking zone: | 230 to 250° C |
| average time of direct contact of the product in the extruder: | 8 minutes |
| rotation rate of the screws: | 40 r.p.m. |

These extrusion conditions according to the invention guarantee that products are obtained having a good hardness and impact strength as well as a high gloss. (cf. Table 1, column A).

EXAMPLE 2

In a polymerization apparatus consisting of a 20 liter autoclave for a mass prepolymerization and a 40 liter autoclave for a suspension polymerization 1,530 g of EPTR were dissolved in 6,800 g of styrene while stirring in the prepolymerization vessel (P vessel) for 8 hours at 50° C. After the rubber had dissolved 2,140 g of acrylonitrile, 21 g of di-t-butylperoxide as initiator and 210 g of white oil were added. The contents of the vessel were heated to 115° C at 1 atmosphere gauge and the temperature was maintained until the prepolymerisate had undergone the phase change and obtained a solids content of 30 to 32%.

The contents of the vessel were cooled to 65° C. Then 49 g of 75% dibenzoylperoxide and 3.2 g of di-t-butylperoxide were added with 150 g of styrene and mixed with the prepolymerizate for 15 minutes. Thereafter the mixture was discharged into the suspension vessel (S vessel) which already contained a solution of partially saponified polyvinyl acetate (having a residual acetyl content of 12% and a viscosity of the 4% by weight aqueous solution at 20° C of about 40 centistokes) in 16.5 liters of distilled water. The whole was dispersed for half an hour at 80° C, and polymerization was carried on at 85° C for one hour, at 90° C for one hour, and at 100° C for three hours and terminated. The polymer beads were separated from water, dried and mixed with 26 g of 2,6-di-tertiary butyl-4-methylphenol as stabilizer.

The product was extruded as in example 1, case A, by means of a Leistritz-double screw extruder under the following conditions:

| | |
|---|---|
| temperature of the shearing zone: | 160° C |
| temperature of the cross-linking zone: | 230 to 250° C |
| average time of direct contact of the product in the extruder: | 6 minutes |

-continued

| | |
|---|---|
| rate of rotation of the screw: | 60 r.p.m. |

These polymerization and extrusion conditions according to the invention also guarantee that products are obtained having a good hardness and impact strength as well as a high gloss (cf. Table 1, column B).

EXAMPLE 3

In the same polymerization apparatus as in example 2, 1,700 g of EPTR were dissolved while stirring in 6,800 g of styrene for 8 hours at 50° C in the P vessel. After the rubber had dissolved, 2,140 g of acrylonitrile, 10.7 g of di-t-butylperoxide, 21 g of dimeric α-methyl styrene and 321 g of white oil were added. The contents of the vessel were heated at 1 atmosphere gauge to 120° C and the temperature was maintained until the prepolymerisate had undergone the phase change and had obtained a solids content of 34 to 36%. The contents of the vessel were cooled to 65° C. Thereafter 50 g of 75% dibenzoylperoxide were added with 150 g of styrene and mixed with the prepolymerisate for 15 minutes. Thereafter the mixture was discharged into the suspension vessel and polymerization was carried on and terminated as described in example 2.

The product was extruded by means of a Leistritz-double screw extruder under the following conditions:

| | |
|---|---|
| temperature of the shearing zone: | 200° C |
| temperature of the cross-linking zone: | 220 to 240° C |
| average time of direct contact of the product in the extruder: | 5 minutes |
| rate of rotation of the screws: | 80 r.p.m. |

The test data are summarized in Table 1, column C.

EXAMPLE 4

In the same polymerization apparatus as in examples 2 and 3 1,700 g of EPTR were dissolved while stirring in 6,800 g of styrene in the P vessel for 8 hours at 50° C. After dissolution of the rubber 2,140 g of acrylonitrile, 13.9 g of di-t-butylperoxide and 210 g of white oil were added. The contents of the vessel were heated at 1 atmosphere gauge to 120° C and his temperature was maintained until the prepolymerisate had undergone a phase change and had reached a solids contents of 35%. The content of the vessel were cooled to 65° C, thereafter 50 g of 75% dibenzoylperoxide and 6.4 g of t-butyl hydroperoxide were added with 150 g of styrene and mixed with the prepolymerisate for 15 minutes. Thereafter the reaction mixture was discharged into the suspension vessel. Polymerization was continued and terminated as described in example 2.

The product was extruded by means of a Leistritz-double screw laboratory extruder under the following conditions:

| | |
|---|---|
| temperature of the shearing zone: | 180° C |
| temperature of the cross-linking zone: | 240° C |
| average time of direct contact of the product in the extruder: | 12 minutes |
| rate of rotation of the screws: | 25 r.p.m. |

The test data are summarized in Table 1, column D.

COMPARATIVE EXAMPLES 1 and 2

The extrusion of the product was carried out by means of and Alpine single screw extruder (case E) and a Schwabenthan single screw extruder (case F).

The single screw extruders used were laboratory extruders with relatively short screws. The average time of contact of the product in the extruder of from 5 to 20 seconds depending on the number of rotations of the screw was very short. An adequate cross-linking of the sheared rubber particles could not be obtained within this period. No two step temperature programm could be realized either because of the shortness of the extruders. As a consequence thereof a considerable decrease of the notched impact strength values was noticed. A considerable inhomogeneity of shearing was also observed, causing a decrease of the gloss values (cf. Table 2, columns E and F).

| | |
|---|---|
| Case E (Alpine) | |
| extrusion temperature: | 200 to 230° C |
| rotation speed of the screw: | 120 r.p.m. |
| average time of contact: | 30 seconds |
| Case F: (Schwabenthan) | |
| extrusion temperature: | 200 to 230° C |
| rotation speed of the screw: | 60 r.p.m. |
| average time of contact: | 50 seconds |

The shearing and, consequently, the gloss values could be improved in both cases by increasing the rate of rotation of the screws. The times of direct contact, however, got still shorter so that a cross-linking could not be obtained within this period. Though the products obtained certainly had a high gloss and hardness, they had a decreased toughness (cf. Table 2, column G).

| | |
|---|---|
| Case G: (Alpine) | |
| extrusion temperature: | 200 to 250° C |
| rate of rotation of the screw: | 450 r.p.m. |
| average time of contact: | 10 seconds |

COMPARATIVE EXAMPLE 3

The reaction mixture was prepolymerized in the P vessel in the same apparatus and in the same manner as in example 1, thereafter a suspension was prepared in the S vessel by dispersing for half an hour at 80° C and the polymerization was continued for one hour at 85° C, for one hour at 90° C and for three hours at 100° C and then terminated. Polymerization was followed by a cross-linking in the suspension for five hours at 140° C. The polymer beads were extruded and test specimens were obtained from the granulate by injection moulding.

| | |
|---|---|
| Case H: (Alpine) | |
| extrusion temperature: | 200 to 230° C |
| rate of rotation of the screw: | 120 r.p.m. |
| average time of contact: | 30 seconds |

The test data are summarized in Table 3, column H.

COMPARATIVE EXAMPLE 4

In the same apparatus as in example 1 5,400 g of EPTR were dissolved while stirring in the P vessel in 25,230 g of styrene for 8 hours at 50° C. After the rubber had dissolved 7,970 g of acrylonitrile, 45 g of di-t-butylperoxide and 450 g of white oil were added. The contents of the vessel were heated at 1 atmosphere gauge to 120° C and the temperature was maintained by vigorously stirring until the prepolymerisate had undergone a phase change. After having reduced a solids content of 30 to 32% 4,900 g of styrene, 1,540 g of acrylonitrile, 225 of dimeric α-methyl styrene, 9 g of n-dodecyl mercaptan and 45 g of di-t-butylperoxide were added. After a mixing time of 15 minutes without decreasing the temperature the mixture was discharged into the S vessel, which already contained the aqueous solution of partially saponified polyvinyl acetate as described in Example 1. The whole was dispersed for one hour at 110° C, heated to 142° C and polymerisation was continued for 5 hours and terminated, whereby a cross-linking of the rubber phase could be observed.

The polymer beads were extruded and the granulate was injection moulded to give test specimens. The test data are shown in Table 2, column I.

TABLE 1

| | Test data of examples 1 to 4: | | | |
|---|---|---|---|---|
| | A | B | C | D |
| notched impact strength at 23° C (according to DIN 53,453) (kg cm/cm²) | 18 | 15.5 | 14 | 16 |
| impact strength at 23° C (according to DIN 53,453) (kg cm/cm²) | 120 | 110 | 105 | 150 |
| gloss values (%)* | 80 | 70 | 85 | 75 |
| ball indentation hardness (30 sec.) (according to DIN 53,456) (kg/cm²) | 1030 | 990 | 1010 | 1000 |
| Vicat softening point (according to DIN 53,460) (C°) | 98 | 96 | 49 | 95 |
| cross-linking of the rubber particles in the suspension | no | no | no | no |
| shearing and cross-linking of the rubber particles during extrusion | yes | yes | yes | yes |
| morphology of the rubber particles after suspension (μ) | 50–120 | 20–60 | 50–100 | 20–70 |
| resistance to shearing of the morphology adjusted in the course of the polymerization | no | no | no | no |

*calculated on a black glass standard according to Bruno Lange; the measurings were carried out by means of a Lange gloss determining apparatus (45°).

TABLE 2

| | Test data of comparative examples 1 to 4: | | | | |
|---|---|---|---|---|---|
| | E | F | G | H | I |
| notched impact strength at 23° C (according to DIN 53,453) (kg cm/cm²) | 10 | 9 | 3.5 | 7.5 | 9.5 |
| impact strength at 23° C (according to DIN 53,453) (kg cm/cm²) | 80 | 80 | 20 | 40 | 60 |
| gloss values (%)* | 50 | 45 | 25 | 30 | 80 |
| ball indentation hardness (30 sec.) (according to DIN 53,456) (kg/cm²) | 1030 | 1020 | 590 | 850 | 1010 |
| Vicat softening point (according to DIN 53,460) (C°) | 98 | 98 | 95 | 96 | 96 |
| cross-linking of the rubber particles in the suspension | no | no | yes | yes | no |
| shearing and cross-linking of the rubber particles during extrusion | yes** | yes** | partial | no | yes** |
| morphology of the rubber particles after suspension (μ) | 50–120 | 50–120 | 50–100 | 2–10 | 50–120 |
| resistance to shearing of the morphology adjusted in the course of the polymerization | no | no | no | yes | no |

*calculated on a black glass standard according to Bruno Lange; the measuring were carried out by means of a Lange gloss determining apparatus (45°).
**unsatisfactory because of the brief time of contact in the extruder.

What is claimed is:

1. Process for preparing impact resistant styrene graft copolymers by a mass or suspension polymerization initiated thermally or by monomer soluble initiators of
(a) 98 to 70% by weight of a mixture of
aa. 90 to 70% by weight of a monomer selected from styrene, α-methyl styrene, styrene methylated in the nucleus, styrene halogenated in the nuleus, vinyl cyclohexane, methylated derivatives of vinyl cyclohexane, halogenated derivatives of vinyl cyclohexane and mixtures of styrene with a foregoing monomer with ab. 10 to 30% by weight of a monomer selected from acrylonitrile, acrylic acid esters, substituted acrylonitriles, substituted acrylic acid esters and mixtures of such monomers with b. 2 to 30% by weight of an ethylene/propylene/tertiary component rubber (EPTR), the quantities (aa) and (ab) being calculated on the total quantity of monomers and the quantities (a) and (b) being calculated on the total quantity of monomers and rubber, which comprises adding prior to or during polymerization an organic peroxide and submitting the polymer obtained to a two-step extrusion, whereby rubber particles of a size of less than 1 $\mu$ are prepared by product shearing in the melt in the first step at temperatures of 130° to 240° C. and a cross-linking of the rubber particles is carried out in the second step at temperatures of 200° to 280° C, the quantity, half life and moment of addition of the peroxide as well as the polymerization and shearing temperatures being so selected that after the termination of the shearing a quantity of peroxide sufficient for cross-linking the polymer is still present in the polymer, said quantity of peroxide being in the range of about 0.05 to about 0.5% by weight calculated on the total quantity of monomers and rubber.

2. Process as claimed in claim 1, which comprises adding the organic peroxide in an amount of about 0.06 to 0.6% by weight calculated on the total quantity of monomers and rubber.

3. Process as claimed in claim 1, which comprises adding an organic peroxide having a half life of at least 5 hours at 120° C.

4. A process as claimed in claim 3, in which the polymerization is carried out in two steps comprising a mass polymerization step and a suspension polymerization step and the organic peroxide is added prior to or in the course of the first step (prepolymerization).

5. Process as claimed in claim 1, which comprises carrying out the shearing (first extrusion step) at temperatures of from 150° to 180° C.

6. Process as claimed in claim 1, which comprises carrying out the cross-linking (second extrusion step) at temperatures of 220° to 250° C.

7. A process as claimed in claim 1, which comprises using a starting materials a mixture of 80 to 70% by weight of the monomer (aa) and 20 to 30% by weight of the monomer (ab).

* * * * *